United States Patent
Kwon et al.

(10) Patent No.: US 6,242,140 B1
(45) Date of Patent: Jun. 5, 2001

(54) METHOD FOR MANUFACTURING COLOR FILTER

(75) Inventors: Jang-hyuk Kwon; Si-hyun Lee; Joo-sang Park; Lee-gon Kim; Seong-taek Lee; Young-sook Choi, all of Suwon; Tae-min Kang; Kyu-hwan Choi, both of Seoul, all of (KR)

(73) Assignee: Samsung SDI Co., Ltd., Kyungki-Do (KR)

( * ) Notice: Subject to any disclaimer, the term of this patent is extended or adjusted under 35 U.S.C. 154(b) by 0 days.

(21) Appl. No.: 09/340,665

(22) Filed: Jun. 29, 1999

Related U.S. Application Data

(63) Continuation-in-part of application No. 09/042,611, filed on Mar. 17, 1998, now abandoned.

(30) Foreign Application Priority Data

May 23, 1997 (KR) .................................................. 97-20394
Sep. 24, 1998 (KR) .................................................. 98-39663

(51) Int. Cl.[7] ............................. G02B 5/20; G02F 1/1335
(52) U.S. Cl. ................................. 430/7; 430/200; 430/945
(58) Field of Search .................................. 430/7, 945, 200

(56) References Cited

U.S. PATENT DOCUMENTS

| | | | |
|---|---|---|---|
| 5,482,803 | 1/1996 | Ishiwata et al. | 430/7 |
| 5,521,035 | 5/1996 | Wolk et al. | 430/20 |

FOREIGN PATENT DOCUMENTS

| | | |
|---|---|---|
| 41725 | 1/1992 | (JP) . |
| 477717 | 3/1992 | (JP) . |
| 4-100005 | 4/1992 | (JP) . |
| 5-53008 | 3/1993 | (JP) . |
| 6-242311 | 9/1994 | (JP) . |
| 6-265720 | 9/1994 | (JP) . |
| 6242311 | 9/1994 | (JP) . |
| 6265720 | 9/1994 | (JP) . |
| 756014 | 3/1995 | (JP) . |
| 7104113 | 4/1995 | (JP) . |
| 7146480 | 6/1995 | (JP) . |
| 8-190012 | 7/1996 | (JP) . |
| 10-206625 | * 8/1998 | (JP) . |

* cited by examiner

*Primary Examiner*—John A. McPherson
(74) *Attorney, Agent, or Firm*—Leydig, Voit & Mayer, Ltd.

(57) ABSTRACT

A method for manufacturing a color filter by thermal transfer using a laser beam with uniform energy distribution. The method includes forming a black matrix pattern on a substrate by photolithography. A transfer film having thermal color layers is placed on the substrate, and a laser beam with uniform energy distribution irradiates the transfer film to transfer the color layers onto the substrate. The substrate onto which the color layer has been transferred, is cured at 200~300° C. Therefore, by using the laser beam with uniform energy distribution, or a laser beam which scans by dithering, for the thermal transfer, the quality of an image formed at the edges of the is improved and the surface roughness is reduced, resulting in an excellent color filter.

16 Claims, 12 Drawing Sheets

METHOD FOR MANUFACTURING COLOR FILTER

This disclosure is a continuation-in-part of U.S. patent application Ser. No. 09/042,611, filed Mar. 17, 1998, now abandoned.

BACKGROUND OF THE INVENTION

1. Field of the Invention

The present invention relates to a method for manufacturing a color filter, and more particularly, to a method for manufacturing a color filter of a liquid crystal display (LCD), by a thermal transfer method using a laser beam with modified energy distribution.

2. Description of the Related Art

A conventional color filter has the structure as shown in FIG. 1. The conventional color filter includes black matrix layers 12 on a glass substrate 11, red, blue and green color filter layers 13a, 13b and 13c formed among the black matrix layers 12, and a protective layer 14 and a transparent electrode layer 15 sequentially formed on the black matrix layer 12 and the color filter layers 13a, 13b and 13c.

The color filter is manufactured by a pigment dispersion method, a printing method or an electrodeposition method. According to the pigment dispersion method, the color filter is formed by coating, exposing, developing and sintering a pigment dispersed in a photosensitive resin. The above methods provide excellent accuracy and reproducibility, but manufacturing process is too long and complicated.

The color filter may also be manufactured by a printing method in which red, green and blue inks are coated on a printing board. However, the printing process has poor accuracy and reproducibility.

In the electrodeposition method, red, green and blue color filters are electrochemically formed on transparent electrodes. By this method, the planarity of the color filter is good, but color characteristics, such as purity, are deteriorated. To solve the above problems, a thermal transfer method has recently been proposed. U.S. Pat. Nos. 5,220,348, 5,256,506, 5,278,023 and 5,308,737 discloses a thermal transfer method. According to these disclosures, for the thermal transfer method, at least a light source, a transfer film and a substrate are required. The light emitted from the light source is absorbed by a light absorbent in the transfer film, and converted into heat energy. A material for forming a transfer layer of the transfer film is transferred onto a substrate by the heat energy, thereby resulting in a desired image. Also, U.S. Pat. No. 5,521,035 discloses that the thermal transfer method can be applied to the manufacture of a color filter for a LCD. In the manufacture of a color filter by the conventional methods, a laser beam having a shape like a Gaussian distribution, as shown in FIG. 2, is used as a light source for the transfer of a transfer layer.

U.S. Pat. No. 4,925,523 discloses the use of two or three laser beams having a shape like a Gaussian distribution so as to improve the etching depth and etching efficiency during etching of an organic material by a laser beam. In detail, an organic material is excited by a laser beam having a short wavelength and etched by adopting a laser beam having a long wavelength, wherein the size of two laser beams are similar to each other.

U.S. Pat. No. 5,018,805 discloses a laser printer using a plurality of lasers for a printing process, in which different laser beams are simultaneously irradiated onto different regions, not one region, in order to increase the printing speed.

In the thermal transfer method, the quality of transfer pattern depends on the energy distribution of a laser beam used for the transfer. In the case where a color filter is formed by the thermal transfer method as described above, using a laser having the Gaussian distribution as shown in FIG. 2, the laser generates a Gaussian beam 31 having a predetermined diameter as shown in FIG. 3, to scan an arbitrary color filter pattern 32 in the X direction for thermal transfer. In this way, the intensity of beams becomes weak at the edge of the pattern 32, the quality of image formed on the edge is deteriorated compared to the image formed on the center of the pattern 32. To solve these problems, the entire energy level throughout the pattern 32 can be strengthened, thereby improving the quality of an image at the edge of the pattern 32. However, the energy level becomes excessive at the center of the Gaussian beams, thereby causing unevenness to a surface of the final color filter pattern.

SUMMARY OF THE INVENTION

It is an object of the present invention to provide a method for manufacturing a color filter having good surface roughness, in addition to being excellent in the formation of an image at the edge of a color filter pattern.

Accordingly, to achieve the above object, the present invention, as embodied and broadly defined herein, provides a method for manufacturing a color filter, comprising the steps of:

(a) forming a black matrix pattern on a substrate by photolithography;

(b) placing a transfer film having thermal color layers on the substrate;

(c) irradiating a laser beam with uniform energy distribution onto the transfer film to transfer the color layers onto the substrate; and (d) curing the substrate onto which the color layer has been transferred, at 200~300° C.

Preferably, in the step ☐ the laser beam is a complex laser beam formed of unit laser beams with different energy levels. The energy intensity of the unit laser beams located at the edges is higher than the energy intensity of the unit laser beam located at the center.

Also, the laser beam includes a plurality of unit laser beams having a high energy intensity at the edges, and a unit laser beam having a high energy intensity at the center.

According to another aspect of the invention, as embodied herein, a method for manufacturing a color filter, comprising the steps of:

(a) forming a black matrix pattern on a substrate by photolithography;

(b) placing a transfer film having thermal color layers on the substrate;

(c) irradiating a laser beam which dithers in a direction perpendicular to a transfer direction of the color layer, onto the transfer film to transfer the color layer onto the substrate; and (d) curing the substrate onto which the color layer has been transferred, at 200~300° C.

Preferably, the laser beam has uniform energy distribution over the entire transfer film, or dithers such that the energy intensity is stronger at the edges than at the center, and the section of laser beam has an enlogated form in the transfer direction.

In the step @ the laser beam is a complex laser beam formed of unit laser beams with equal energy levels. Here, the unit laser beams dither with different phases.

The laser beam vibrates with a frequency of 100~1,000 kHz, having a width of 50~150 μm.

In a method of color filter according to the present invention, a transparent electrode is formed on the red, green and blue color filter layers. Here, the thickness of the transparent electrode layer is 800~4000 Å and the sheet resistance thereof is 2~100 Ω/□.

It is also preferable that after the red, green and blue color filter layers are formed on the substrate, the buffer layer is formed to a thickness of dozens through hundreds of Å to increase adhesion between the color filter layer and the transparent electrode layer, before the transparent electrode layer is formed. The buffer layer is formed of $SiO_2$ or a silicon nitride ($SiN_x$).

Preferably, a protective layer is formed on the substrate where the black matrix layer and the red, green and blue color filter layers are formed, to increase planarity. More preferably, an $SiO_2$ layer acting as a buffer layer is further formed on the protective layer to a thickness of dozens through hundreds of Å.

Also, preferably, a surface of the substrate is treated with UV rays and/or $O_3$ or a surfactant, before and after forming the black matrix layer, the color filter layer, the transparent electrode layer and the buffer ($SiO_2$) layer.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENTS

A color filter pattern should have a flat surface and a constant width with a straight edge. Thus, the energy distribution of a laser beam irradiating the color filter pattern should be constant and energy distribution at the edge of the filter pattern should change steeply such that the change of width due to deviation in sensitivity of a film at the edge can be minimized.

In the case of using a laser beam with energy distribution like a Gaussian function, in particular, a laser beam having the size of 60 μm or more, the change in energy distribution at the edge of the pattern becomes smooth. Thus, the change in energy at the center can be reduced while the change in energy at the edge can be steep, by modifying the laser beam with the energy distribution like a Gaussian function. In a modification of the energy distribution, a complex laser beam formed of unit laser beams having different energy distributions is used, or a laser beam that dithers in a direction perpendicular to the transfer direction of a color layer, can irradiate a transfer film.

A method for manufacturing a color filter according to the present invention will now be described.

Figure 1:
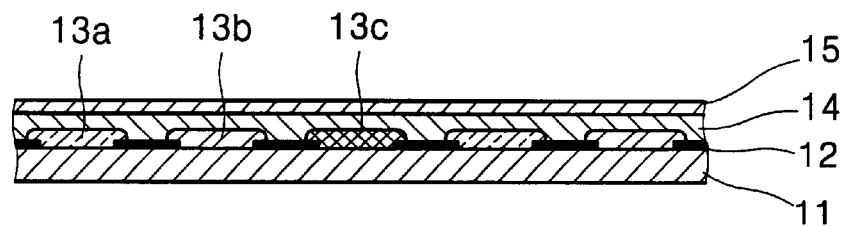
FIG. 1 shows the structure of a conventional color filter.
Figure 2:
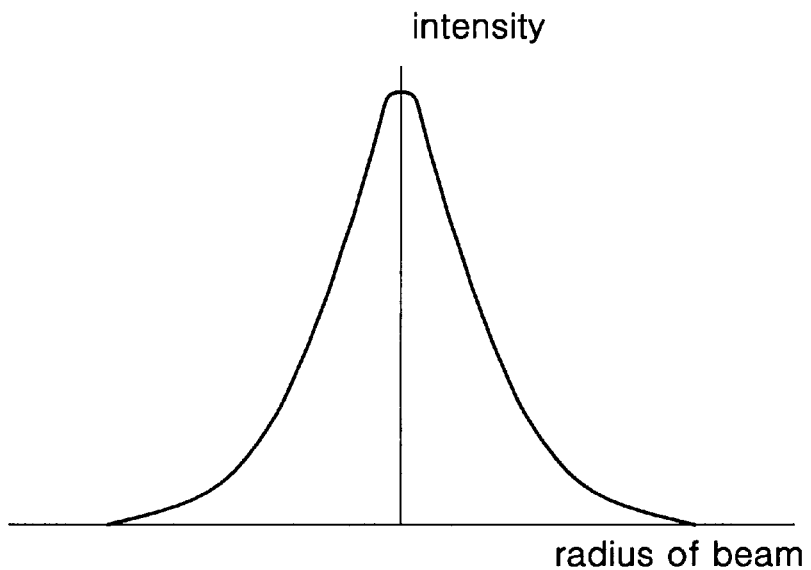
FIG. 2 shows the energy distribution of laser beams for manufacture of a color filter by a conventional thermal transfer method.
Figure 3:
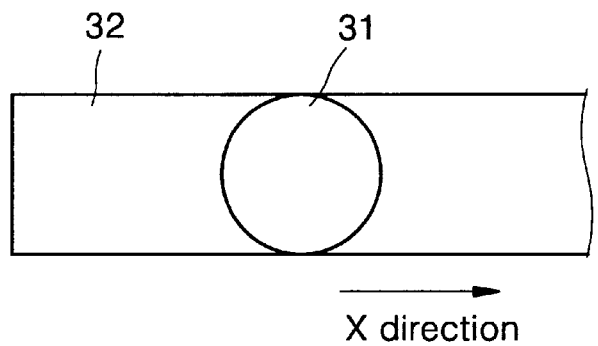
FIG. 3 is a view illustrating a method for manufacturing a color filter by the conventional thermal transfer method.
Figure 4A:
FIGS. 4A through 4F, and FIGS. 5A through 5H are sectional views illustrating a method for manufacturing a color filter according to the present invention.
Figure 4B:

Referring to FIG. 4, a black matrix formation material is applied to a substrate 41 to form a black matrix layer 42a (FIG. 4A), and a black matrix pattern 42b is formed through a photolithography process (FIG. 4B). A transfer film 43 for a first color filter is placed on the substrate 41 where the black matrix pattern 42b is formed at a predetermined interval. Subsequently, when light is irradiated through a base film 43a of the transfer film 43, a light absorbing layer 43b absorbs light to emit heat. Due to the emitted heat, a first color filter layer 43c is transferred to the substrate 31, to thereby form a first color filter layer 43a (FIG. 4C). Second and third color filter layers 44b and 44c are formed in the same manner. Then, the resultant is cured at 200~300° C. (FIG. 4D).

During the curing process, a color filter layer is cured through a condensation reaction or a radical reaction, and the hardness of the color filter layer increases from approximately 1 H (before curing) to 3H or higher. As the hardness of the color filter layer increases through the curing process, the film shrinks. At this time, the shrinkage factor of the film thickness is 3~20%.

The curing process may be performed once after forming the first, second and third color filters, as shown in FIG. 4, or, three times after forming each color filter layer, as shown in FIG. 5. The respective curing processes make the whole processing line longer, but prevents an influence between first formed color filter layer and the next transfer layer.

A protective layer 45 is formed on the substrate 31 after curing. Then, a transparent electrode layer 46 is formed on the protective layer 45 using sputtering or an E-beam (FIG. 4E). When the thickness of the color filter layer is sufficiently uniform, the transparent electrode layer 46 may be formed directly on the first, second and third color filter layers 44a, 44b and 44c without the protective layer 45 (FIG. 4F).

The manufacturing method of a color filter of FIG. 5 is same as that of FIG. 4, but a separate curing process is performed for each color filter layer cured.

Figure 5A:
Figure 5B:
Figure 5C:
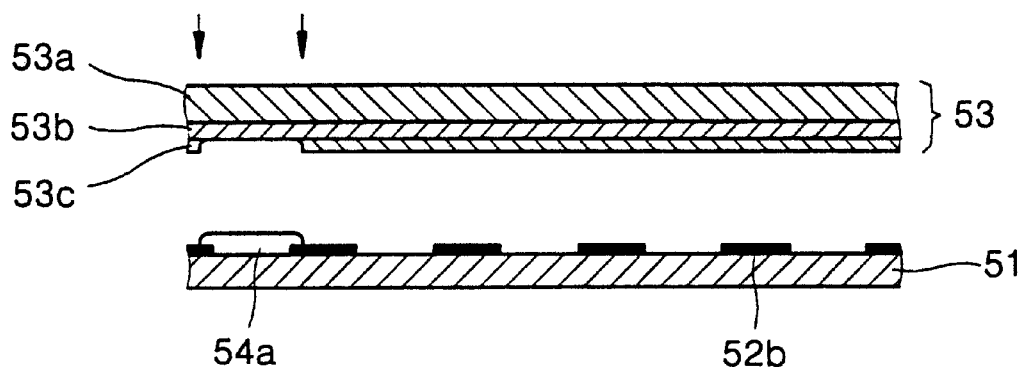
Figure 5D:
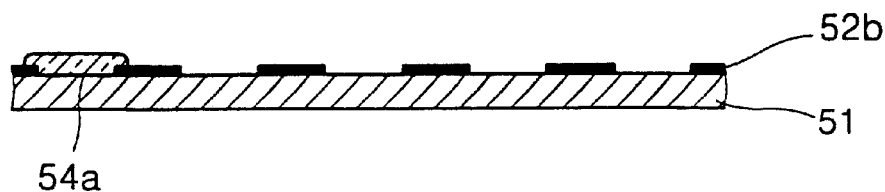

That is, a material for a black matrix is applied to the substrate 51, to form a black matrix layer 52a (FIG. 5A), and a black matrix pattern 52b is formed through a photolithography process (FIG. 5B). A transfer film 53 for a first color filter layer is placed on the substrate 51 where the black matrix pattern 52b is formed. Subsequently, when light is irradiated through a base film 53a of the transfer film 53, a light absorbing layer 53b absorbs light to emit heat. At this time, the emitted heat transfers a first color filter layer 53c onto the substrate 51, to thereby form a first color filter layer 54a (FIG. 5C). Then, the resultant is cured at 200~300° C. (FIG. 5D).

Figure 5E:
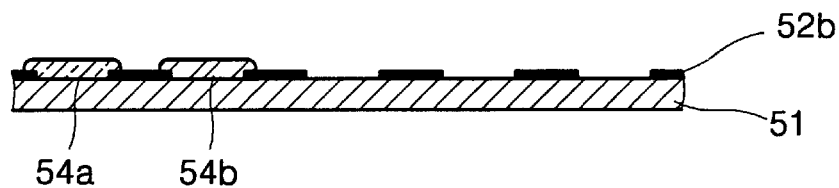

A second color filter layer is transferred in the same manner. Then, the resultant is again cured at 200~300° C. to form a second color filter layer 54b (FIG. 5E).

Figure 5F:
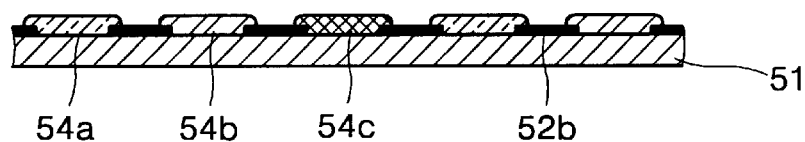
Figure 5G:
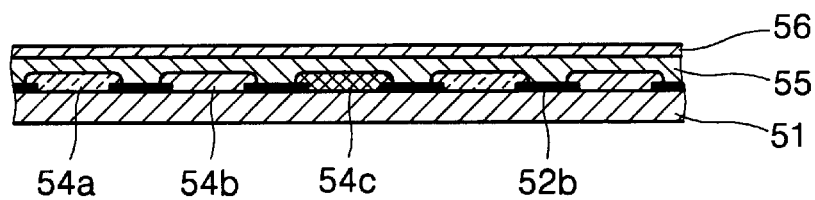

A third color filter layer 54c is transferred in the same manner and cured as above. FIG. 5F shows a state that the first, second and third color filter layers 54a, 54b and 54c are formed on the substrate 51 (FIG. 5F).

Figure 5H:
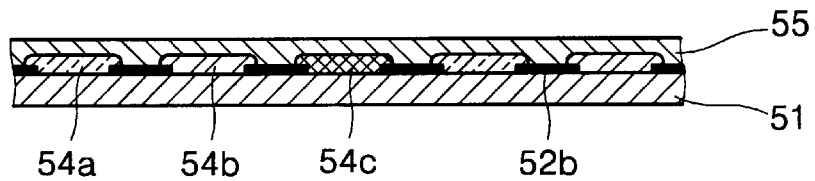

The protective layer 55 and the transparent electrode layer 56 are sequentially formed on the substrate 51 where the color filter layers are formed (FIG. 5G), or the transparent electrode layer 56 may be formed directly on the first, second and third color filter layers 54a, 54b and 54c without the protective layer 55 (FIG. 5H).

In the manufacturing method shown in FIGS. 4 and 5, when the material for a black matrix is graphite or an organic material obtained by dispersing a black pigment in a photosensitive resin, the curing process of the black matrix pattern is required. The curing process of the black matrix pattern is performed prior to the formation step of the first color filter layer, in the curing step of the first color filter or in the curing step of the first, second and third color filter layers. And, when the material for a black matrix is graphite, the curing temperature is 100~300° C. Otherwise, the curing temperature is 200~300° C.

Figure 4C:
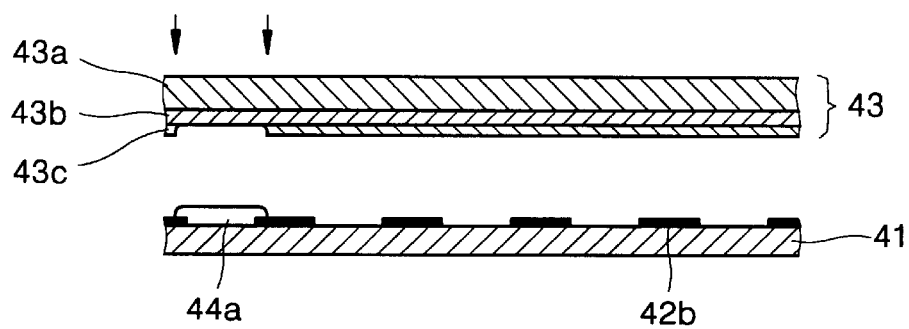
Figure 4D:
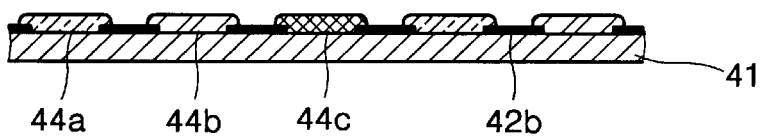
Figure 4E:
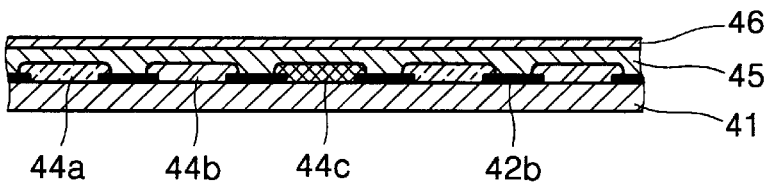
Figure 4F:
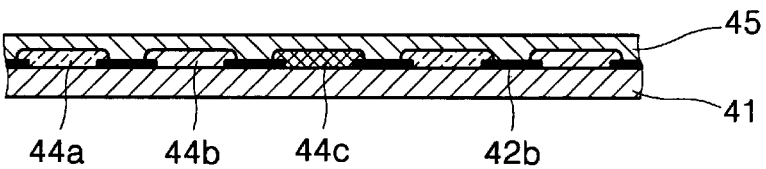
Figure 6A:
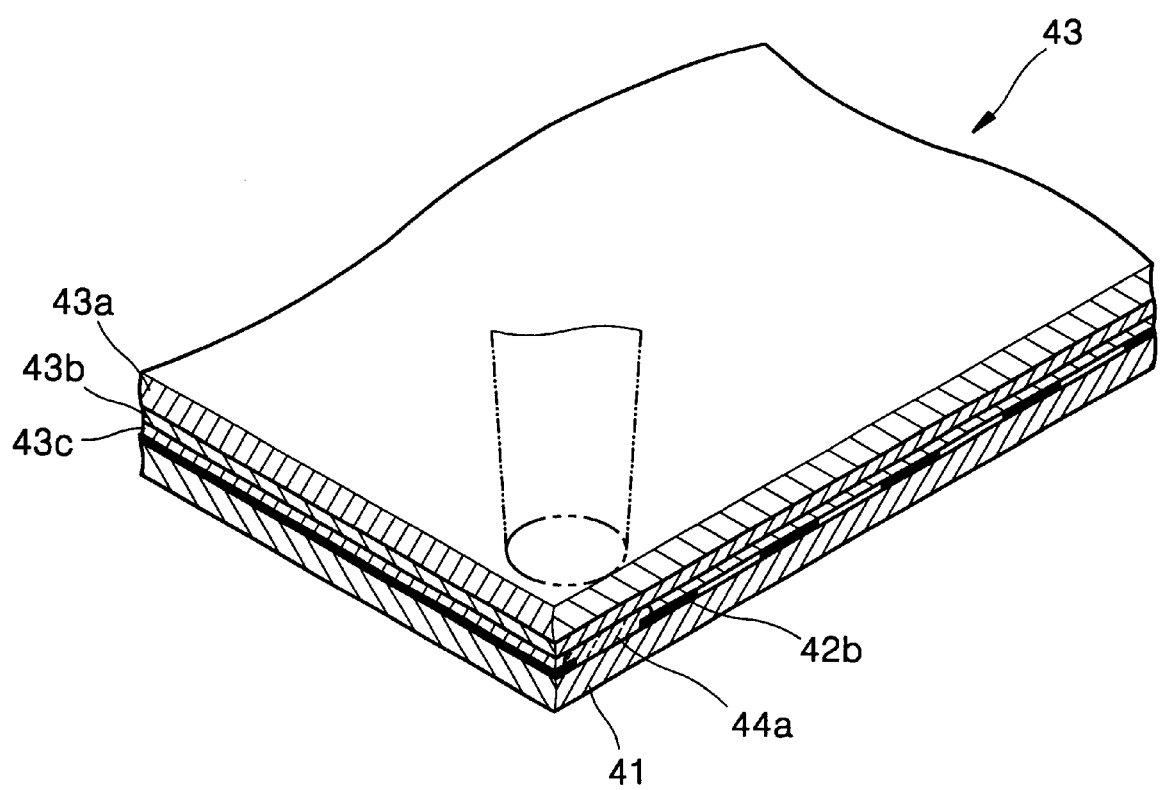
FIG. 6A is a perspective view of FIGS. 4C and 5C illustrating irradiation with a laser beam of a transfer film.

FIG. 6A is a perspective view illustrating the transfer of a color filter layer, as shown in FIGS. 4C and 5C, by irradiating with a laser beam a transfer layer.

Figure 6B:
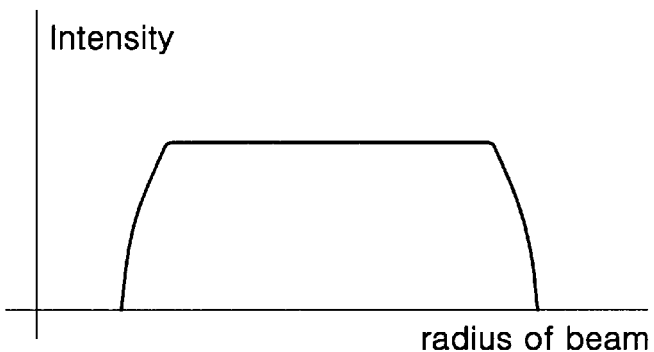
FIGS. 6B through 6D show the shapes of laser beams used in the present invention.
Figure 6C:
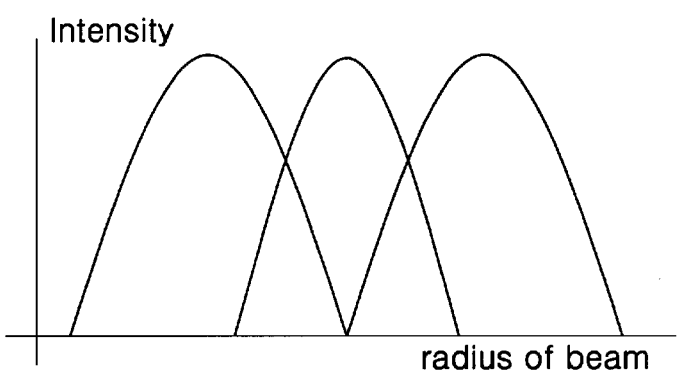

Referring to FIG. 6A, when transferring a transfer layer, a laser beam having a uniform energy distribution as shown in FIG. 6B is used as a light source. For such a uniform energy distribution, two or more small beams can be overlapped for use, or the size and irradiation interval of the beam can be adjusted for the energy distribution having a desired width. In detail, as shown in FIG. 6C, a complex laser beam formed of unit laser beams having different energy distributions can be used, in which the energy intensities of unit laser beams located at the edges are higher than that of the unit laser beam located at the center. Alternatively, a laser beam comprising a plurality of unit laser beams having a high energy intensity at the edges, and a unit laser beam having a high energy intensity at the center, can be used as shown in FIG. 6D.

Figure 6D:
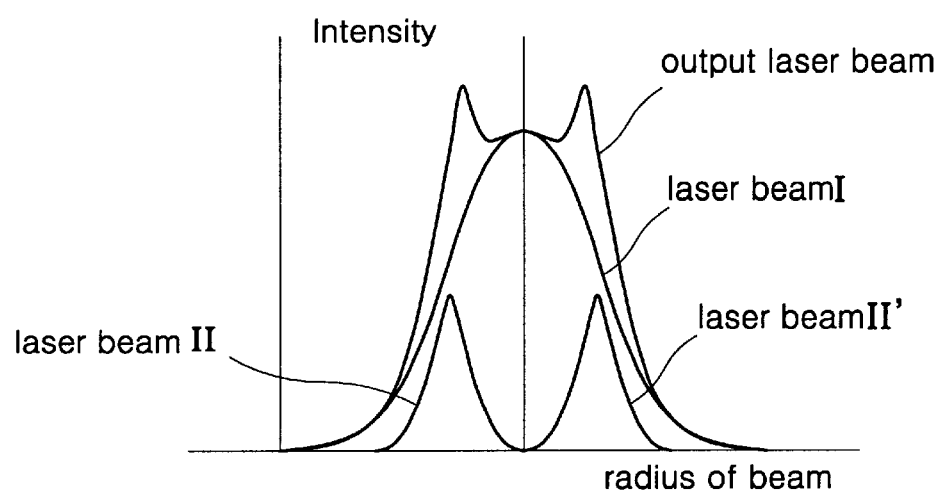

Referring to FIG. 6D, a large laser beam I, a small laser beam II (having a steep energy distribution) and a laser beam II' are mixed to increase the slope of the energy distribution at a threshold energy which is the minimum energy for transfer, such that the boundary is distinctly transferred, resulting in an image having excellent edge characteristics.

Also, in the present invention, a laser beam that dithers in a direction perpendicular to the transfer direction of a color layer can be used as a light source for the transfer of the color layer.

Dithering is to vibrating a laser beam in a direction perpendicular to the scanning direction, by which the energy distribution at the center can be adjusted according to the vibrating waves and the energy distribution at the edge can change steeply. For a straight edge, the size of beam should be small in a direction perpendicular to the scanning direction, the degree of overlapping due to vibration should be great, and the size of beam should be large in the scanning direction. Preferably, the section of a laser beam is an enlongated form in the scanning direction, that is, in the transfer direction.

Such dithering can be implemented by changing the traveling direction of the laser beam using an acousto-optic modulator (AOM). Preferably, the vibration waves may be triangle waves, sine waves or modified waves thereof, the frequency of vibration is selected in the range from 100 kHz to 1 MHz by taking into account the TMOS speed and the energy distribution, and the amplitude of vibration is in the range of 50~150 $\mu$m.

Figure 7:
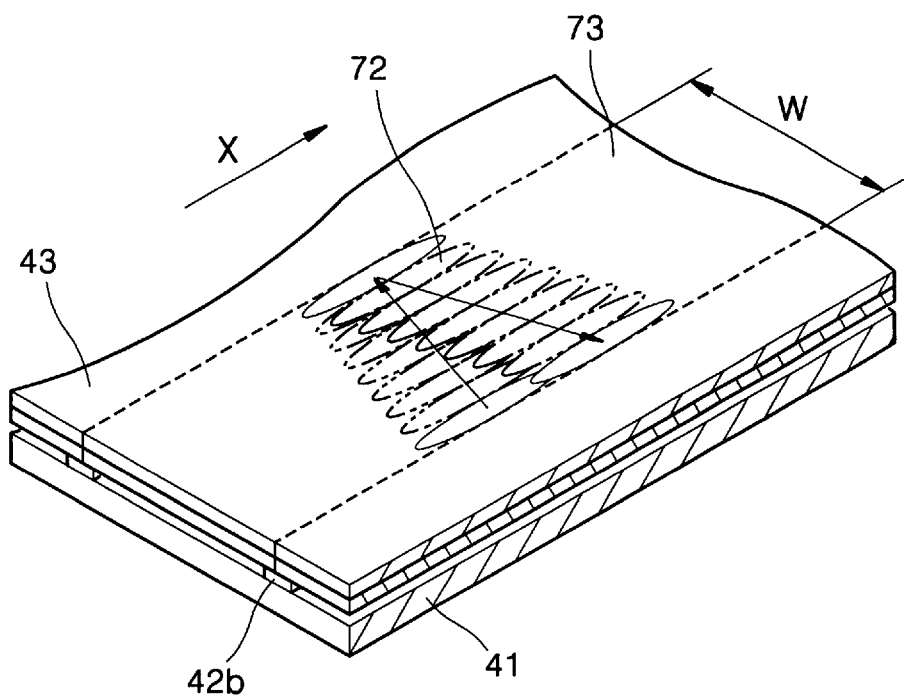
FIG. 7 is a diagram illustrating the irradiation with a dithering laser beam of a color filter pattern.

FIG. 7 is a diagram illustrating a method for manufacturing a color filter using a dithering laser beam. In FIG. 7, reference numeral 43 represents a transfer film 73 for color filter pattern formed on a substrate 41, reference numeral 42b represents a black matrix pattern, reference numeral 73 represents a color filter pattern formed on the substrate 41, and reference numeral 72 represents a laser beam, a light source, which emits light along the pattern 73.

The laser beam 72 scans in the X direction along the color filter pattern 73, in addition to dithering which is vibration in the vertical direction, unlike a conventional method in which only simple scanning is performed in the above direction. Dithering the laser beam 72 is for an accurate thermal transfer onto both edges of the pattern 73.

Preferably, the dithering rate is higher than the scanning rate of the laser beam 72, for example, with a frequency of 100~1000 kHz, and more preferably 100~300 kHz.

Preferably, the laser beam 72 has various shapes including circular and elliptical shapes, and more preferably, an elliptical shape. Preferably the laser beam 72 has an elliptical shape having the major axis parallel to the scanning direction. The reason for this is to make uniform the energy distribution over the entire pattern 73 by increasing the degree of overlapping in spots of laser beam 72 when the laser beam 72 scans the pattern 73.

In the case where the width W of the pattern 73 is 60~150 $\mu$m, which is actually equal to the width of a color filter used for a color LCD, preferably the laser beam 72 is formed in an elliptical shape having a major axis of 200~500 $\mu$m and a minor axis of 20~50 $\mu$m.

Figure 8:
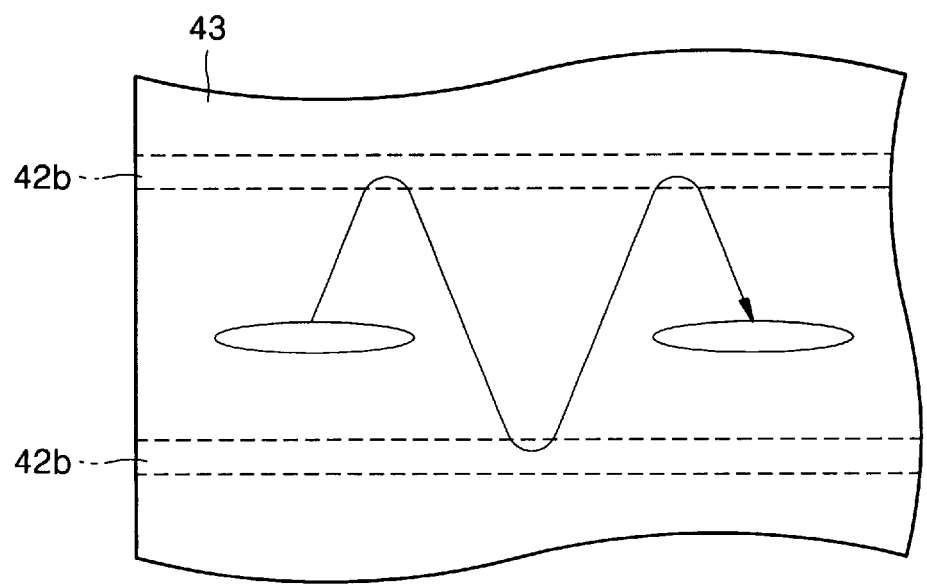
FIGS. 8, 9, and 10 are views showing examples of movements of dithering laser beams according to the present invention.
Figure 9:
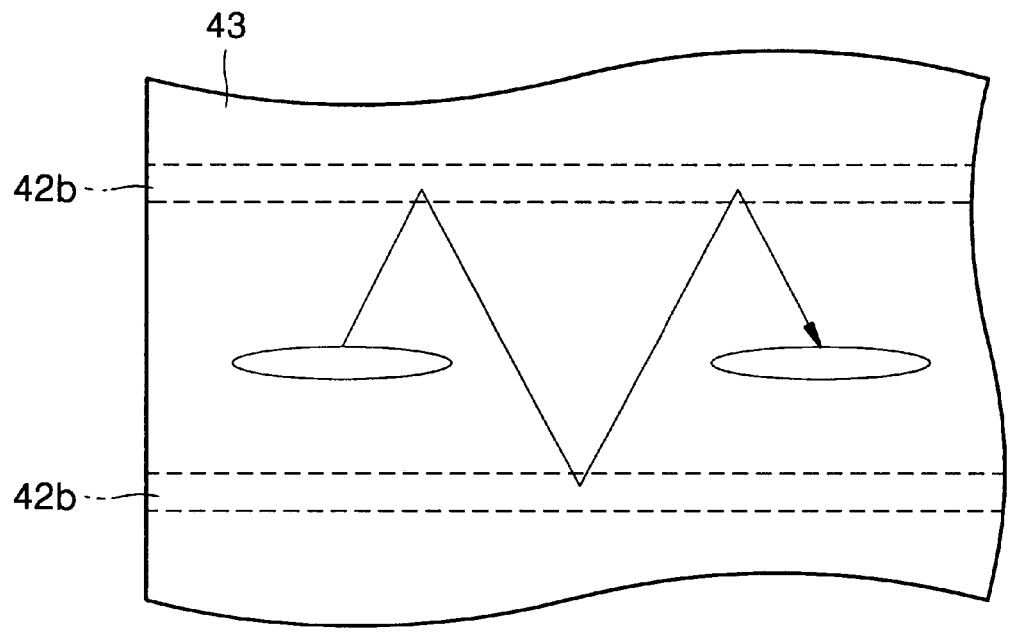
Figure 10:
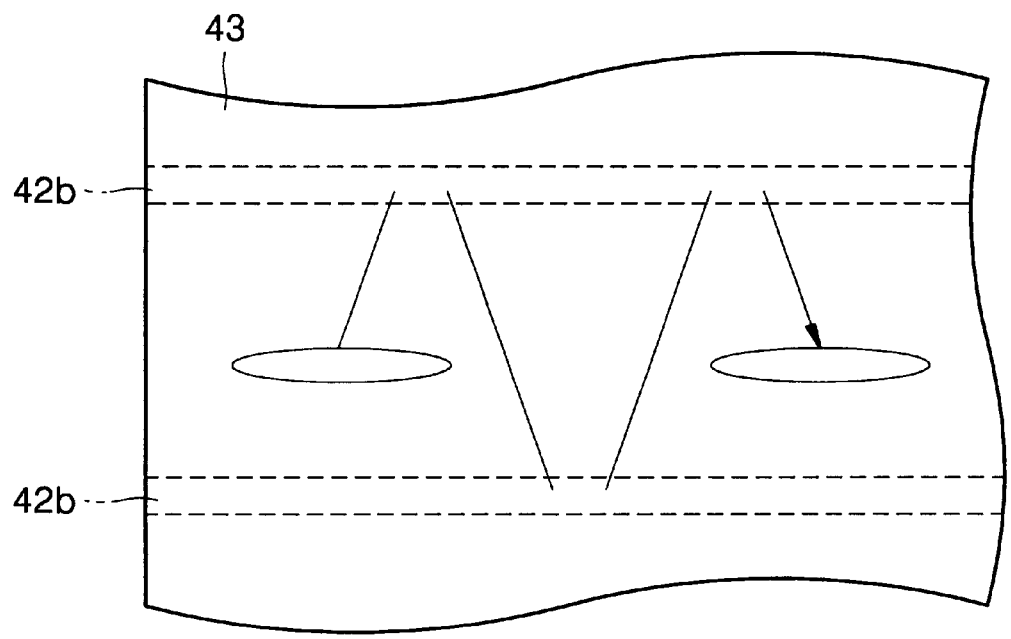

Also, the laser beam 72 may dither to modulate the movement of the beam by various waveforms. As shown in FIGS. 8 through 10, which show various waves formed as the laser beam 72 dithers, the laser beam dithers with the movement modulated by sine waveform, saw tooth waveform, or trapezoidal waveform.

Figure 11:
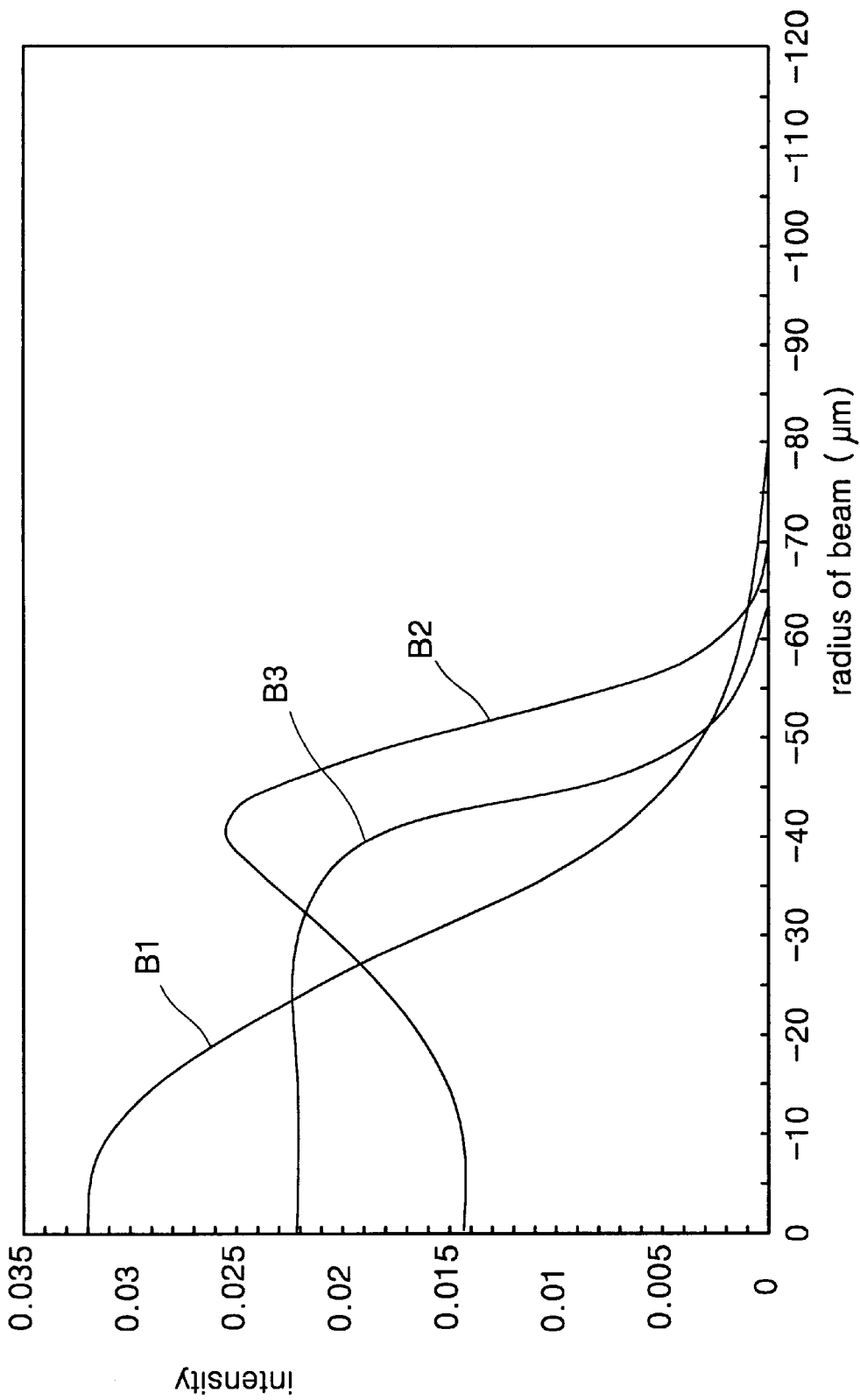
FIG. 11 shows the energy distribution of the laser beam on the pattern.

In the case where a color filter is formed using a thermal transfer method by scanning the dithering laser beam 72 onto a pattern, the energy distribution of the laser beam on the pattern is obtained as shown in FIG. 11.

In FIG. 11, the graph indicated by B1 represents the energy distribution of a Gaussian laser beam which simply scans a pattern without dithering as in a conventional method. As indicated by B1, in the case of Gaussian laser beam, the energy intensity is the highest at the center and smoothly decreases toward the edges. The graphs indicated by B2 and B3 represents the energy distribution of a laser beam over a pattern when the laser beam scans the pattern by dithering with a movement modulated by sinusoidal waveform and saw tooth waveform, respectively. In both cases, the energy distribution changes steeply at the edge of the pattern. From the energy distribution shown in FIG. 11, it can be ascertained that the intensity of the laser beam according to the present invention barely decreases at the edge, resulting in excellent heat transfer characteristics at the edge of the pattern.

Also, due to the similar intensity of the beam between the center and the edge of the pattern, deterioration in surface roughness of the pattern can be prevented.

In other words, in the case using the Gaussian laser beam B1 as in a conventional method, the intensity of the Gaussian laser beam being strong at the center of the pattern compared to at the edge, the surface of the pattern can not be planarized due to excessive energy distribution at the center of the pattern. However, the laser beam used for the present invention can prevent such problem which may occur with the Gaussian laser beam.

Figure 12:
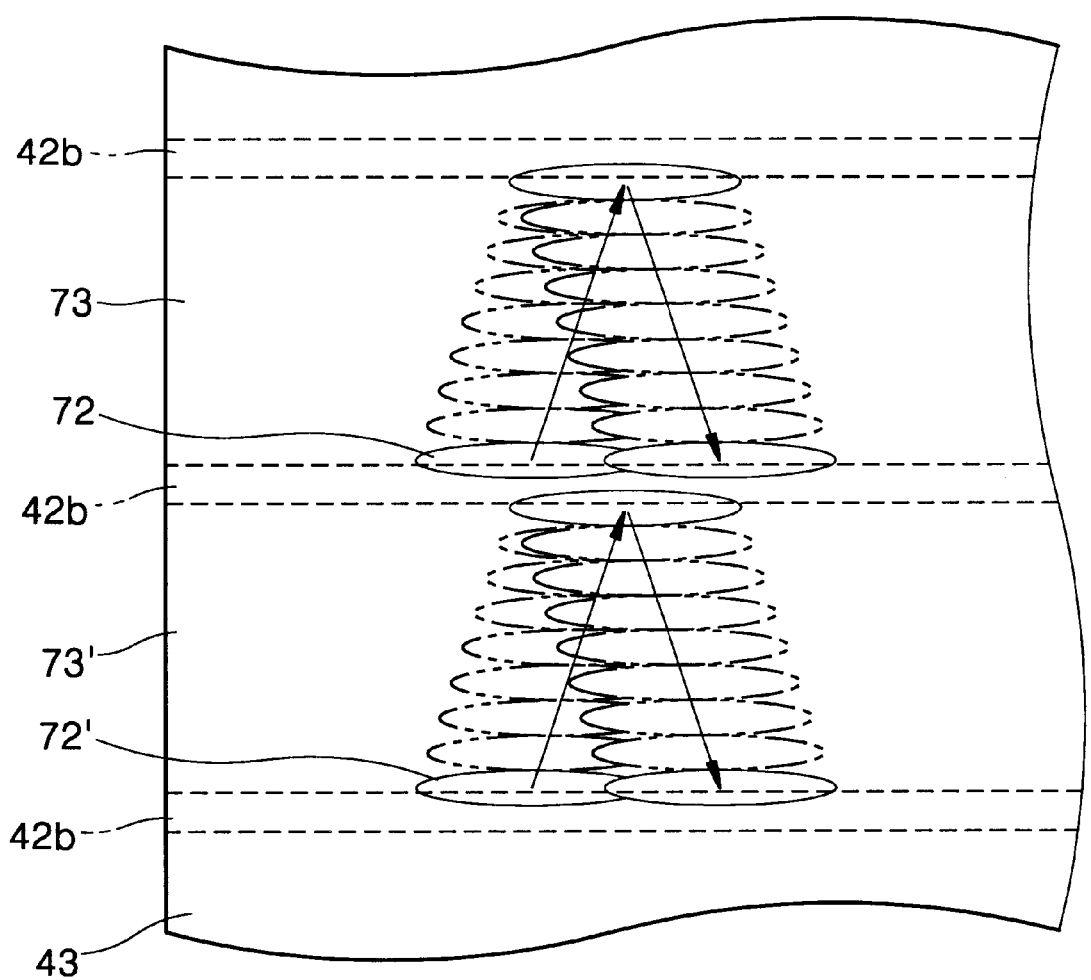
FIGS. 12, 13, and 14 illustrate a method for manufacturing a color filter according to an embodiment of the present invention.

FIG. 12 shows one of modifications of the laser beam. As shown in FIG. 12, laser beams 72 and 72' are emitted from a single laser (not shown) and divided into two beams to parallel scan neighboring color filter patterns 73 and 73' by dithering. Preferably, the two beams scanning the neighboring color filter patterns 73 and 73' are synchronized with each other. When a plurality of dithering laser beams are synchronized to scan a color filter pattern as the case shown in FIG. 12, a plurality of color filter patterns can be manufactured at the same time.

Alternatively, laser beams emitted from a plurality of lasers can be used for the manufacture of a color filter.

Figure 13:
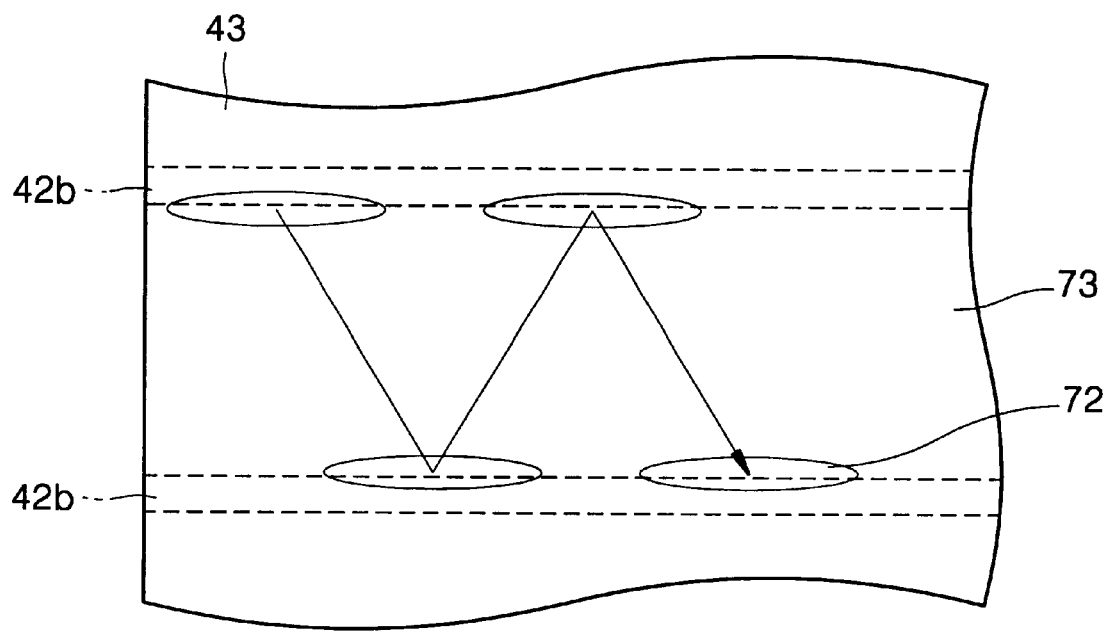
Figure 14:
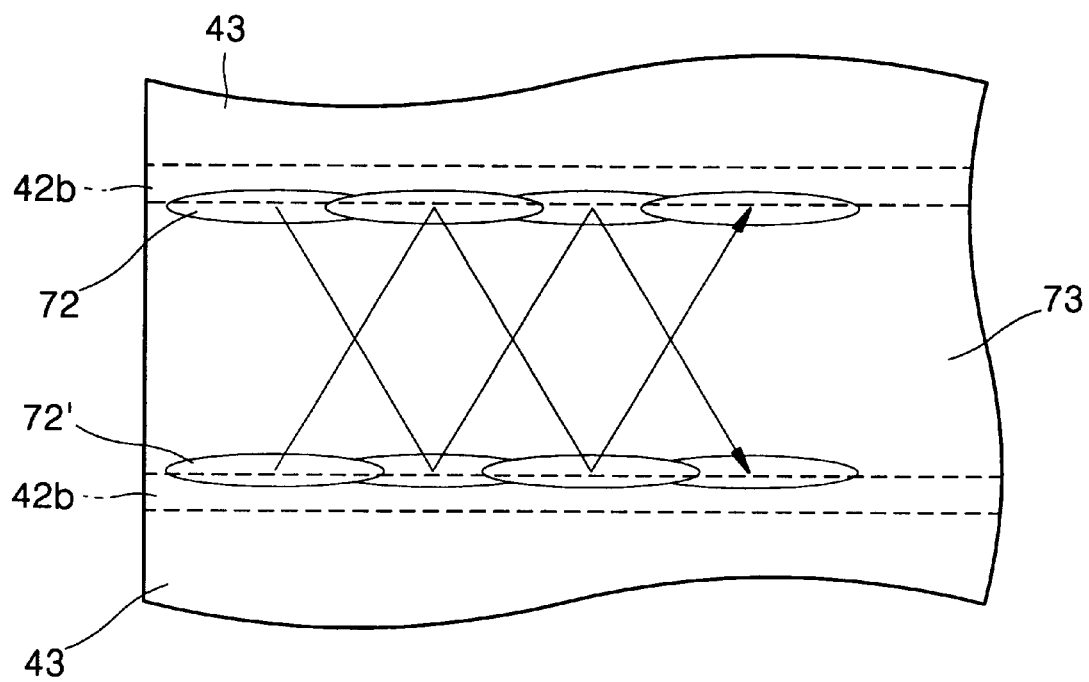

FIGS. 13 and 14 show examples of the case using a plurality of lasers. In FIG. 13, laser beams emitted from a plurality of lasers (not shown) overlap to form a single laser beam 72, and the single laser beam 72 scans a color filter pattern 73 by dithering.

In detail, the laser beams emitted from a plurality of lasers, for example, two lasers, overlap into a single laser beam and the single laser beam scans a desired color filter pattern by dithering via a transfer film. This method has an advantage in that the scanning rate is faster than the case using a single laser. The fast scanning rate is due to the beam having an intensity twice as strong as a laser beam from a single laser.

FIG. 14 shows another example of using a plurality of laser beams. As shown in FIG. 14, a plurality of laser beams 72 and 72' emitted from a plurality of lasers (not shown) do not overlap each other, and scan a pattern by dithering with crisscross movement, where the movement of each is modulated with a different phase.

Heat transfer films used in the present invention are not limited, and general laser induced transfer films can be used. The basic structure of a transfer film is shown in FIG. AC. Several layers other than the layers included in the basic structure may be further formed for a performance increase.

Referring to FIG. 4C, a base film 43a which supports a thermal transfer film, is formed of a single layer or compound multiple layers. Preferably, the thickness of the base film is 10~500 μm. The base film is formed of an excellent polymer film, for example, polyester, polyacrylate, epoxy resin, polyethylene, polypropylene or polystyrene. In particular, polyethylene terephthalate (PET) film, one of polyester films, is more preferred.

A light absorption layer 43b is formed of an inorganic material or an organic material obtained by dispersing a coloring agent in a binding resin, having excellent absorption property at a UV-infrared wavelength.

The inorganic material includes metals having an optical density of 0.2~0.3, such as aluminum (Al), tin (Sn), titanium (Ti), cobalt (Co), zinc (Zn) or lead (Pb), oxides thereof, and the mixtures thereof. Among these materials, Al or aluminum oxide is preferred. Preferably, the light absorption layer formed of an inorganic material has a thickness of 0.1~10 μm.

The organic material is referred to the material obtained by dispersing a coloring agent such as pigment or dye, or a dispersing agent in a polymer binding resin. The binding resin having a network structure which can endure a high energy during a transfer process is preferred. Also, the pigment and dye includes carbon black, graphite pigment and IR-dye, capable of absorbing light at a UV-infrared wavelength.

A transfer layer 43c may have different compositions according to a transfer material. In general, for preparation of a composition for the transfer layer, a pigment or dye and a dispersing agent are mixed, and dispersed in a solvent. Then, a binding resin and other additives are added to the mixture, resulting in a composition for the transfer layer.

The black matrix layer according to the present invention may be formed as one of following structures, where the thickness of the black matrix layer is preferably 400~3000 Å.

1) a Cr layer
2) a CrOx layer
3) a Cr layer/a CrOx layer
4) a CrOx layer/a Cr layer
5) a CrOx layer/a Cr layer/a CrOx layer Second, a photosensitive organic material may be used for a black matrix layer. The photosensitive organic material is obtained by dispersing a pigment such as carbon black in a photosensitive resin, Then the photosensitive organic material is spin-coated on the substrate, exposed and developed to form a black matrix pattern. Here, preferably, the thickness of the black matrix pattern is 0.5~1.5 μm.

Third, graphite may be used for a black matrix layer. A positive photoresist is coated on a substrate, and the coated substrate is exposed and developed to form a photoresist pattern.

Then, graphite is spin-coated to a thickness of 1000~5000 Å on the substrate where the photoresist pattern is formed, and then the photoresist pattern is completely removed using a basic solution (lift-off method), to complete the black matrix pattern.

Preferably, the double layer of Cr and CrOx is used for the black matrix layer. Instead of the Cr and the CrOx, CrNx, chromium sulfide or a mixture may be used.

Figure 15:
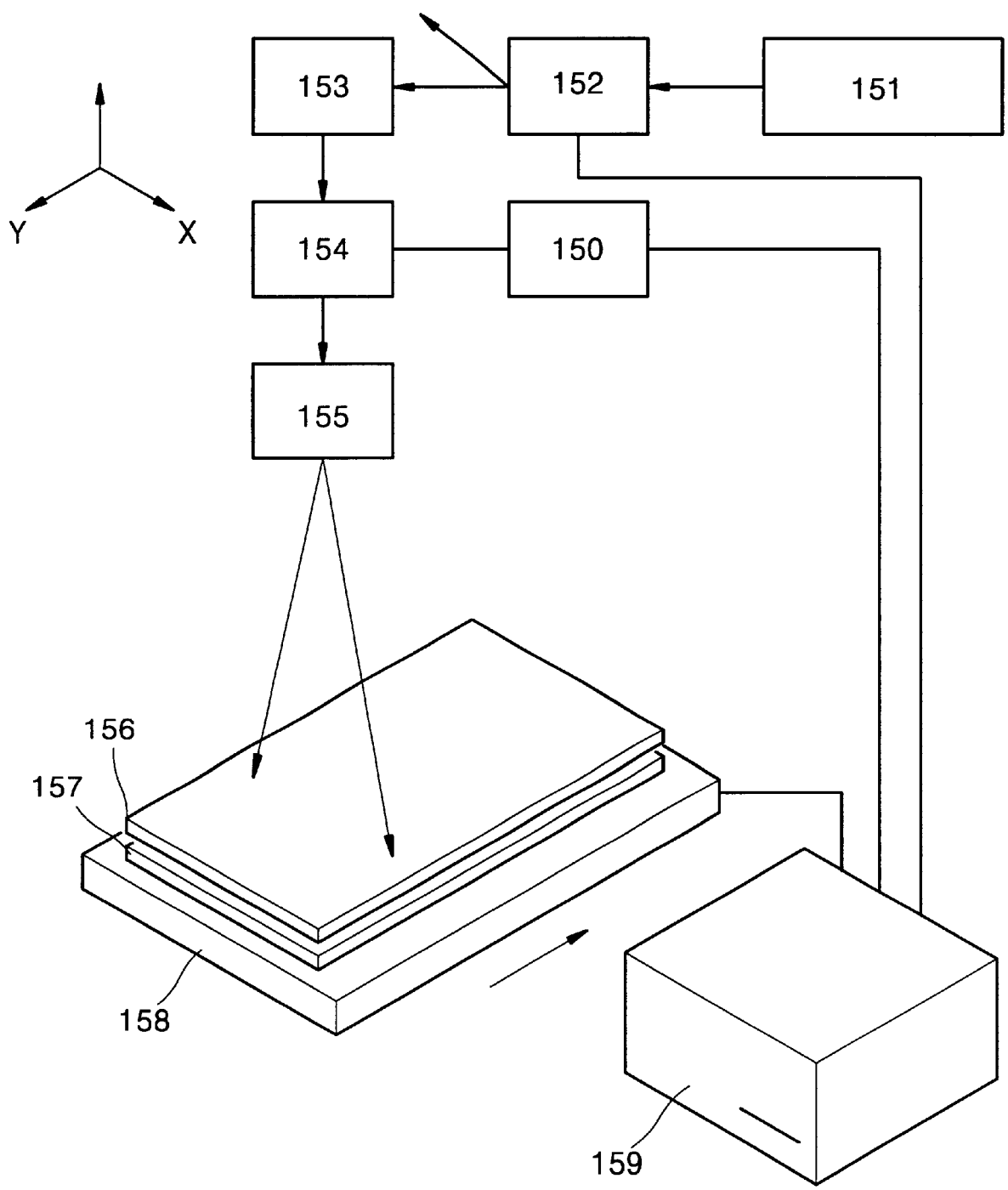
FIG. 15 is a block diagram of a transfer apparatus according to the present invention.

FIG. 15 is a diagram showing the structure of a transfer apparatus according to the present invention.

In the transfer apparatus of FIG. 15 a high-power laser beam is emitted from the light source 151. The light source may be a high-output solid laser such a Nd/YAG, a gas laser such as $CO_2$ or CO, or a Nd/YAG laser combined with a diode (Diode-coupled Nd/YAG of 0.1~40 W).

The emitted laser beam is a single beam or multiple beams having equivalent intensities obtained by dividing the single beam through a beam splitter. Also, a dot-formed pattern as well as a simple pattern-formed pattern may be manufactured by dividing one beam into multiple beams and controlling the intensity of each beam.

Preferably, a single laser beam instead of multiple beams having equivalent intensities is used. This is because in the case of the single beam, the simple pattern-formed pattern may be manufactured by a simple apparatus and in a short time.

The laser beam which is a single beam or multiple beams reaches a scanning mirror 154 by controlling an intensity ratio in a modulator 152 according to the form to be transferred, through a first lens array 153. Here, the scanning mirror 154 transfers light to a desired position along an X-axis of the substrate.

The light reaching the scanning mirror 154 is irradiated through a second lens array 155 onto a transfer film 86 which is coated with a transfer material. At this time, only the material coated on the irradiated portion of the transfer film 156 is transferred to the substrate 157. Here, the width of the pattern is determined by the sensitivity of a transfer film, distribution and intensity of optical energy and a scan ratio of light. The movement of a stage 158 is controlled by a computer 159. Here, a reference numeral 150 indicates a scanning mirror controller for controlling the scanning mirror 154.

According to the present invention, the light source may be a laser. Here, a usual laser such as a solid, gas, semiconductor, dye or excimer may be used. Also, the beam may be a multi-mode beam or a single mode Gaussian beam.

Hereinafter, the present invention will be described using examples and comparative examples. However, these examples are merely illustrative and the present invention is not limited to those examples.

EXAMPLE

I. Manufacture of a Black Matrix Pattern by Photolithography

1. Manufacture of a Cr, CrOx, Cr/CrOx or CrOx/Cr/CrOx Black Matrix and a Pattern Thereof The black matrix layer was manufactured by batch-type sputtering device under the conditions of TABLE 1. The Cr film employed argon (Ar) as a discharge gas, and the CrOx film employed $CO_2$ and $N_2$ as reaction gases.

The surface of the black matrix layer was cleaned using a cleaning solution (ETcold, Environmental Tech, USA), and then the cleaned surface was ultrasonically treated in deionized water, and photoresist (SRC-300, Shipley, or HKR 230M, Hochest Korea) was coated on the surface to a thickness of approximately 1~2 $\mu$m. The photoresist layer was exposed at approximately 50~80 mJ/cm$^2$ using the photomask, and then the exposed photoresist layer was developed for 60sec using a developer (MIF 312, Hochest Korea), to form a photoresist pattern.

The black matrix (chromium) layer was etched using the photoresist pattern and a Cr etching solution MA-SO$_3$ (ammonium nitrate:HNO$_3$:deionized water=11.2:4.5:84.3, Dongwoo Semiconductor Co.). Then, the photoresist pattern was removed using 3% NaOH or N-methylpyrrolidone (NMP), to form a black matrix pattern.

Developing and etching conditions according to materials for forming a black matrix layer are shown in TABLE 2. Here, the normal pattern width of the photomask used was 20 $\mu$m for SVGA and 25 $\mu$m for VGA, and the actual pattern width was 20±0.5 $\mu$m for SVGA and 25±0.5 $\mu$m for VGA.

TABLE 1

| Film type | Target | Oxygen (SCCM) | Argon (SCCM) | Sputter pressure (mTorr) | Voltage (kw) | Substrate temperature (° C.) | Film thickness (nm) |
|---|---|---|---|---|---|---|---|
| Cr single film | Cr (T2) | 0.0 | 900 | 8.9 × 10$^{-3}$ | DC 5.5 | 200 | 1750 |
| CrOx single film | Cr (T1) | CO$_2$:40 N$_2$:19 | 330 | 3.9 × 10$^{-3}$ | DC 5.0 | 200 | 1750 |
| Cr/CrOx double film | Cr (T1) | CO$_2$:40 N$_2$:19 | 330 | 3.9 × 10$^{-3}$ | DC 5.0 | 200 | 1650 |
|  | Cr (T2) |  | 900 | 8.9 × 10$^{-3}$ | DC 5.5 | 200 |  |
| CrOx/Cr double film | Cr (T2) | 0.0 | 900 | 8.9 × 10$^{-3}$ | DC 5.5 | 200 | 1950 |
|  | Cr (T1) | CO$_2$:40 N$_2$:19 | 330 | 3.9 × 10$^{-3}$ | DC 5.0 | 200 |  |
| CrOx/Cr/CrOx triple film | Cr (T2) | CO$_2$:40 N$_2$:19 | 330 | 3.9 × 10$^{-3}$ | DC 5.0 | 200 | 1650 |
|  | Cr (T1) | 0.0 | 900 | 8.9 × 10$^{-3}$ | DC 5.5 | 200 |  |
|  | Cr (T2) | CO$_2$:40 N$_2$:19 | 330 | 3.9 × 10$^{-3}$ | DC 5.0 | 200 |  |

TABLE 2

|  | Developing | Cleaning | Etching | Cleaning |
|---|---|---|---|---|
| Cr single film (1750Å) | spray: 50 sec 0.1 kgf/cm$^2$, 25° C. | 48 sec 2.0 kgf/cm$^2$ | spray: 50 sec 0.3 kgf/cm$^2$, 25° C. | 48 sec 2.0 kgf/cm$^2$ |
| CrOx single film (1750Å) | spray: 50 sec 0.1 kgf/cm$^2$, 25° C. | 48 sec 2.0 kgf/cm$^2$ | spray: 40 sec 0.3 kgf/cm$^2$, 25° C. | 48 sec 2.0 kgf/cm$^2$ |
| CrOx/Cr double film (550Å/1400Å) | spray: 50 sec 0.1 kgf/cm$^2$, 25° C. | 48 sec 2.0 kgf/cm$^2$ | spray: 45 sec 0.3 kgf/cm$^2$, 25° C. | 48 sec 2.0 kgf/cm$^2$ |
| Cr/CrOx double film (1100Å/550Å) | spray: 50 sec 0.1 kgf/cm$^2$, 25° C. | 48 sec 2.0 kgf/cm$^2$ | spray: 50 sec 0.3 kgf/cm$^2$, 25° C. | 48 sec 2.0 kgf/cm$^2$ |
| CrOx/Cr/CrOx triple film (550Å/550Å/550Å) | spray: 50 sec 0.1 kgf/cm$^2$, 25° C. | 48 sec 2.0 kgf/cm$^2$ | spray: 50 sec 0.3 kgf/cm$^2$, 25° C. | 48 sec 2.0 kgf/cm$^2$ |

2. Manufacture of an Organic Black Matrix Pattern

A glass substrate(370×400 mm$^2$) was cleaned using a cleaner(ET-cold, Environmental Tech., USA), and then the cleaned glass substrate was ultrasonically treated. A photosensitive organic black matrix (CK-S171, Fuji-Hunt Co.) was spin-coated onto the glass substrate. Subsequently, the resultant was pre-baked to form an organic black matrix layer having a thickness of 1.0 μm.

Then, only a predetermined region of the black matrix layer was exposed at 400 mJ/cm$^2$ using a photomask, and then the resultant was developed in CD (color developer) 20% solution (Fuji-Hunt Co.) for approximately 70sec. Subsequently, the black matrix layer was cleaned under a temperature of 26° C. and a pressure of 140 kg/cm$^2$ to remove the pigment remaining on the surface, and cured at 220° C. for 1 hour. At this time, the nominal pattern width of the photomask was 20 μm for SVGA and 24 μm for VGA, the actual pattern width was 21±0.5 μm for SVGA and 25±0.5 μm for VGA and the size of the Gaussian beam was 105 μm (1/e$^2$).

3. Manufacture of a Graphite Black Matrix Pattern

A glass substrate (370×400 mm$^2$) was cleaned using a cleaner (ET-cold, Environment Tech., U.S.A.), and then the cleaned substrate was ultrasonically treated. A surface of the cleaned glass substrate was UV-treated and annealed.

The glass substrate having a treated surface was spin-coated with a photoresist (PMER-6005, Tokyo Ohka Kogyo Co. LTD) and pre-baked at 120° C., to form a photoresist layer of 1 μm thickness. A predetermined region of the photoresist layer was exposed at 70 mJ/cm$^2$ using a photomask and the resultant was developed by spraying 0.5% NaOH for approximately 64 sec. Subsequently, the resultant was cleaned and dried to form a photoresist pattern.

The photoresist pattern was spin-coated with graphite (LCD-BM12, Hitachi Powdered Metals Co.), and then pre-baked, to form a black matrix layer of 0.4 μm thickness. Subsequently, the black matrix layer was developed using 1% NaOH aqueous solution for 85 sec, and then photoresist was cleaned off with a pressure of 3kgf/cm$^2$ to be completely stripped and further dried. Then, the resultant was recured at 150° C. for 20min, to form a graphite black matrix pattern. At this time, the nominal pattern width of the photomask was 20 μm for SVGA and 25 μm for VGA, and the actual pattern width was 20±0.5 μm for SVGA and 25±0.5 μm for VGA.

II. Formation of Red(R), Green(G) and Blue(B) Color Filter Layers

The substrate where the black matrix pattern was formed was cleaned using a cleaning solution (ET Cold, Environmental Tech., U.S.A.) and then the substrate was ultrasonically treated. Subsequently, a surface of the cleaned substrate was UV-treated and annealed.

A transfer film for the red color filter was placed on the cleaned glass substrate. Then, a single mode laser beam emitted from a CW Nd/YAG (Quantronic 8W) laser was scanned across the transfer film, to form a striped red color filter pattern. Here, the shape of the laser beam spot was ellipse having the major axis of 380 μm and the minor axis of 38 μm, and the dithering of laser beam was implemented by using an acousto-optic modulator (AOM). Also, the power of laser beam was controlled to be 10 W on the transfer film and the scanning rate was maintained at approximately 7 m/sec. Also, the dithering of the laser beam was controlled to move with sine waveform with a frequency of 200 kHz.

After scanning process of the laser beam is completed, the transfer film for the red color filter was removed. Then, striped green and blue color filter patterns were formed in the same manner as the red color filter pattern. The striped color filter patterns may be formed in any order regardless of color.

The red, green and blue color filter patterns were cured at approximately 250° C. for 1 hour.

III. Manufacture of a Color Filter Having No Protective Layer

The substrate where the red, green and blue color filter patterns were formed was cleaned using a cleaning solution (ET-cold, Environmental Tech., U.S.A.), and then ultrasonically treated. Subsequently, a surface of the glass substrate was UV-treated and annealed. Then, an ITO layer having sheet resistivity of 7~8 Ω/□ was formed using a batch-type sputtering apparatus for a flat display device, under the conditions of TABLE 3.

TABLE 3

| Section | Conditions |
| --- | --- |
| Sputtering power | DC 1 kW + RF kW |
| End pressure | 10$^{-7}$ ~ 10$^{-5}$ |
| Sputtering pressure | 2.3 mTorr |
| Film formation speed | 50Å/min |
| Pre-sputtering time | 3 min |
| Film thickness | ~2000 Å |
| Argon (SCCM) | 300 |
| Substrate temperature | 200° C. |

IV. Manufacture of a Color Filter Having a Buffer (SiO$_2$) Layer

A substrate where red(R), green(G) and blue(B) color filter layers were formed was cleaned using a cleaning solution (ET-cold, Environmental Tech., U.S.A.), and then the surface of the substrate was UV-treated and annealed. Subsequently, an ITO layer of 7~8 Ω/□ was formed using a batch-type sputtering apparatus for a flat display device, under the conditions of TABLE 4.

TABLE 4

|  | SiO$_2$ layer | ITO layer |
| --- | --- | --- |
| Sputtering power | RF 3.5 kw | DC KW + RF KW |
| End pressure | 3 × 10$^{-6}$ Torr | 3 × 10$^{-6}$ Torr |
| sputtering pressure | 3.3 × 10$^{-3}$ mTorr | 3.3 × 10$^{-3}$ mTorr |
| Pre-sputtering time | 3 min | 3 min |
| Film thickness | ~2000 Å | ~2000 Å |
| Argon (SCCM) | 300 | 300 |
| Substrate temperature | 200° C. | 200° C. |

V. Manufacture of a Color Filter Having a Protective Layer and a Buffer (SiO$_2$) Layer A glass substrate where red, green and blue color filter layers were formed was cleaned using a cleaning solution (ET-cold, Environmental Tech., U.S.A.), and then ultrasonically treated, and one surface of the substrate was UV-treated and annealed.

Optomers SS6600 and SS0600 (Japan Synthetic Rubber Co.) were mixed.

The mixture was spin-coated onto the UV-treated and annealed surface of the substrate. The resultant was pre-baked at 120° C., and then re-cured at 230° C. for one hour, to form a protective layer having a thickness of 2.0 μm. The substrate where the protective layer was formed was cleaned using a cleaning solution (ET-cold, Environmental Tech., USA), and then ultrasonically treated. The cleaned substrate surface was UV-treated and annealed.

An $SiO_2$ layer was formed to 200 Å in the same manner in the manufacture of the color filter having the $SiO_2$ layer, using a batch type sputter apparatus for a flat display device, and an ITO layer was formed to have a thickness of 2000 Å and a sheet resistivity of 7~8 Ω/□.

COMPARATIVE EXAMPLE 1

A color filter was manufactured by the same method as in Example, except that a Gaussian laser beam was used for transfer of a color layer.

The characteristics of the obtained red, green and blue color filter patterns was observed, and the result is shown in TABLE 5. Also, the characteristics of color filter patterns manufactured in Example are also shown in TABLE 6.

TABLE 5

| Items | Red (R) | Green (G) | Blue (B) |
|---|---|---|---|
| Width of pattern (μm) | 90.34 ± 1.25 | 95.34 ± 1.73 | 99.37 ± 1.55 |
| Roughness at the edges (μm) | 1.75 ± 0.77 | 1.88 ± 0.62 | 1.64 ± 0.56 |
| Surface Roughness (μm) | 0.0565 ± 0.0112 | 0.0954 ± 0.0185 | 0.1032 ± 0.0243 |

TABLE 6

| Items | Red (R) | Green (G) | Blue (B) |
|---|---|---|---|
| Width of pattern (μm) | 94.89 ± 1.08 | 99.98 ± 1.46 | 106.30 ± 0.70 |
| Roughness at the edges (μm) | 1.23 ± 0.36 | 1.51 ± 0.46 | 0.62 ± 0.26 |
| Surface Roughness (μm) | 0.0393 ± 0.0091 | 0.0637 ± 0.0175 | 0.0361 ± 0.0120 |

From TABLEs 5 and 6, it can be ascertained that the color filter patterns according to the present invention show excellent characteristics both at the edges and surface of the patterns. In particular, the surface roughness is excellent as less than 700 Å while that of the color filter manufactured in Comparative example 1 is poor as approximately 1,000 Å.

As described above, in a manufacturing method of a color filter, a color filter and/or a black matrix layer were formed and then cured. Meanwhile, in a conventional thermal transfer method, curing was automatically performed during thermal transfer without a separate curing process. However, according to the present invention, a thermosetting material was used, and a curing process was performed at 200~300° C., (preferably, at approximately 250° C.) for approximately one hour. As a result, the film hardness of the color filter layer was better than by the conventional art.

Film hardness of the color filter layer before and after the curing process is shown in TABLE 7. The film hardness was measured according to Japanese Industry Standard (JIS) K5400.

TABLE 7

|  | Pencil hardness after transfer | Pencil hardness after curing |
|---|---|---|
| Red (R) layer | 1H | 4H |
| Green (G) layer | 1H | 4H |
| Blue (B) layer | 1H | 4–5H |

It is shown in TABLE 7 that the film hardness of the color filter layer was higher after the curing process.

COMPARATIVE EXAMPLE 2

A glass substrate was coated with red coloring photoresist, and then exposed and developed to form a red color filter pattern. Subsequently, green and blue color filter patterns were formed on the glass substrate where the red color filter pattern was formed, using green and blue coloring photoresist instead of the red coloring photoresist.

Here, red 6011L, green 6011L and blue 6011L (Fuji-Hunt Co.) were used for the red, green and blue coloring photoresists, respectively.

Meanwhile, adhesion, chemical resistance, heat durability, light resistance and color coordinate characteristics of the color filter layer manufactured according to the Example and Comparative example 2 were measured, and the results were analyzed as follows. In following TABLEs 8 through 12, each value is a mean value obtained from three or more repetitive tests.

First, the adhesion of each of the red, green and blue color filter layers (thickness: approximately 1.2 μm) was measured according to ASTM D3359-93, X-cut tape test. The result is shown in TABLE 8.

TABLE 8

|  | Red (R) | Green (G) | Blue (B) |
|---|---|---|---|
| Example | 5A | 5A | 5A |
| Comparative Example 2 | 5A | 5A | 5A |

Second, the chemical resistance of each of the red, green and blue color filter layers (thickness: approximately 1.2 μm) was measured by checking the color change of each of the color filter layers after dipping them in a chemical solution such as 5% NaOH, 10% HCl, γ-butyrolactone, N-methyl pyrrolidone (NMP) or isopropyl alcohol (IPA) at 25° C. for approximately 10min. The results are shown in TABLE 9. Here, when $\Delta E_{ab}$ is 3 or less, the chemical resistance is interpreted to be good.

TABLE 9

|  |  | 5% NaOH | 10% HCl | y-butyro-1-actone | NMP | IPA | Acetone | De-ionized water |
|---|---|---|---|---|---|---|---|---|
| Example | red ($\Delta E_{ab}$) | 1.83 | 0.63 | 0.63 | 0.47 | 0.35 | 0.97 | 0.65 |
|  | green ($\Delta E_{ab}$) | 1.86 | 0.59 | 0.55 | 0.58 | 0.50 | 0.58 | 0.85 |
|  | blue ($\Delta E_{ab}$) | 0.43 | 0.35 | 0.82 | 0.35 | 0.78 | 0.23 | 0.49 |
|  | red | 0.86 | 0.41 | 0.29 | 2.59 | 0.31 | 0.59 | 0.65 |

TABLE 9-continued

|  | | 5% NaOH | 10% HCl | y-butyro-1-actone | NMP | IPA | Acetone | De-ionized water |
|---|---|---|---|---|---|---|---|---|
| Comparative Example 2 | ($\Delta E_{ab}$) green | 0.72 | 0.51 | 0.89 | 0.47 | 0.27 | 0.67 | 0.58 |
|  | ($\Delta E_{ab}$) blue | 0.15 | 0.65 | 0.29 | 0.52 | 0.34 | 0.56 | 0.65 |
|  | ($\Delta E_{ab}$) | | | | | | | |

Third, the heat durability of each of the red, green and blue color filter layers (thickness: approximately 1.2 μm) was measured by checking the color change of each color filter layer after placing the color filter layers in an oven at approximately 250° C. at a $N_2$ atmosphere for one hour. The results are shown in TABLE 9.

TABLE 10

|  | Red (R) ($\Delta E_{ab}$) | Green (G) ($\Delta E_{ab}$) | Blue (B) ($\Delta E_{ab}$) |
|---|---|---|---|
| Example | 1.45 | 1.28 | 1.54 |
| Comparative example 2 | 1.25 | 1.45 | 1.36 |

Fourth, the light resistance of each of the red, green and blue color filter layers (thickness: approximately 1.2 μm) is shown in TABLE 11. Here, conditions for measuring the light resistance were as follows.
Equipment: Weather-Ometer Ci65/XW
Temperature: 53~88° C.
Humidity: 20~70% RH
Lamp: Xenon Sunshine Carbon
Time: 250 hours

TABLE 11

|  | Red (R) ($\Delta E_{ab}$) | Green (G) ($\Delta E_{ab}$) | Blue (B) ($\Delta E_{ab}$) |
|---|---|---|---|
| Example | 1.64 | 0.82 | 2.17 |
| Comparative example 2 | 2.85 | 2.82 | 1.81 |

Fifth, color coordinate characteristics of the color filter layers (thickness: approximately 1.2 μm) were measured using an Olympus Spectrophotometer and are shown in TABLE 12. Here, a reference sample was 1737 bare glass (Corning co).

TABLE 12

|  |  | Example | Comparative example 2 |
|---|---|---|---|
| Color coordinate | Red | R(1.0 μm) Y:27.7 X:0.54, y:0.34 | R(1.0 μm) Y:27.7 X:0.53, y:0.34 |
|  | Green | G(1.0 μm) Y:56.6 X:0.32, y:0.50 | G(1.0 μm) Y:56.6 X:0.31, y:0.50 |
|  | Blue | B(1.0 μm) Y:22.1 X:0.15, y:0.16 | B(1.0 μm) Y:22.1 X:0.15, y:0.16 |

As shown in TABLEs 8 through 12, adhesion, chemical resistance, heat durability, light resistance and color coordinate characteristics of the color filter layer according to the present invention were better than those of the comparative example.

Also, the method of manufacturing the color filter according to the present invention is shorter and simpler in a processing line than the comparative example.

According to the present invention, the laser beam with uniform energy distribution is used, or the laser beam scans by dithering for the thermal transfer, so that the quality of an image formed at the edges of the pattern and the surface roughness are enhanced, resulting in an excellent color filter.

According to the present invention, a high temperature curing process is performed and a $SiO_2$ layer as a buffer layer is formed, to thereby form a color filter layer having high film hardness. As a result, during alignment and cleaning processes, stripping at each interface due to deficiency in adhesion between layers is reduced.

Also, due to the enhanced characteristics of the color filter of the present invention, a protective layer is not required.

What is claimed is:

1. A method of manufacturing a color filter comprising:
    forming a black matrix pattern on a substrate by photolithography;
    placing a transfer film having thermal color layers on the substrate;
    irradiating the transfer film with a complex laser beam formed of unit laser beams having different energy intensities to transfer the color layers to the substrate; and
    curing the substrate onto which the color layers have been transferred, at 200~300° C.

2. The method of claim 1, wherein the energy intensities of the unit laser beams located at edges of the laser beam are higher than the energy intensities of the unit laser beams centrally located in the laser beam.

3. The method of claim 1, further comprising curing the substrate having the black matrix pattern at 100~300° C. prior to placing the transfer film on the substrate.

4. The method of claim 1, further comprising forming at least one of a transparent electrode layer, a protective layer, and a buffer layer on the substrate onto which the color layers have been transferred.

5. The method of claim 1, wherein a surface of the substrate is treated by irradiation with ultraviolet light and/or with $O_3$, or a surfactant, before and after forming the black matrix pattern and transferring the color layers.

6. A method of manufacturing a color filter comprising:
    forming a black matrix pattern on a substrate by photolithography;
    placing a transfer film having thermal color layers on a substrate;
    irradiating the transfer film with a laser beam comprising a plurality of unit laser beams having a high energy intensity at edges of the laser beam, and a central unit laser beam having a high energy intensity centrally in the laser beam to transfer the color layers to the substrate; and
    curing the substrate onto which the color layers have been transferred at 200~300° C.

7. A method of manufacturing a color filter comprising:

forming a black matrix pattern on a substrate by photolithography;

placing a transfer film having thermal color layers on the substrate;

irradiating the transfer film with a laser beam which dithers in a direction perpendicular to a transfer direction of the color layers, to transfer the color layers to the substrate; and curing the substrate onto which the color layers have been transferred, at 200~300° C.

8. The method of claim 7, wherein the laser beam has a uniform energy intensity distribution over the transfer film, or dithers such that the energy intensity is stronger at edges of the transfer film than at a center of the transfer film.

9. The method of claim 7, wherein a cross-section of the laser beam has an elongated form in the transfer direction.

10. The method of claim 7, wherein the laser beam vibrates with a frequency of 100~1,000 kHz and has a width of 50–150 $\mu$m.

11. The method of claim 7, wherein the laser beam is a complex laser beam formed on unit laser beams with equal energy intensities.

12. The method of claim 11, wherein the unit laser beams dither with different phases.

13. The method of claim 11, wherein the laser beam has a uniform energy intensity distribution over the transfer film, or dithers such that energy intensity is stronger at edges of the transfer film than at a center of the transfer film.

14. The method of claim 7, further comprising curing the substrate having the black matrix pattern at 100~300° C. prior to placing the transfer film on the substrate.

15. The method of claim 7, further comprising forming at least one of a transparent electrode layer, a protective layer, and a buffer layer on the substrate onto which the color layers have been transferred.

16. The method of claim 7, wherein a surface of the substrate is treated by irradiation with ultraviolet light and/or with $O_3$, or a surfactant, before and after forming the black matrix pattern and transferring the color layers.

\* \* \* \* \*